March 31, 1964 J. WHITEHILL 3,126,739
PRESSURE RESPONSIVE INDICATING APPARATUS
Filed June 13, 1960 5 Sheets-Sheet 1
FIGURE 1
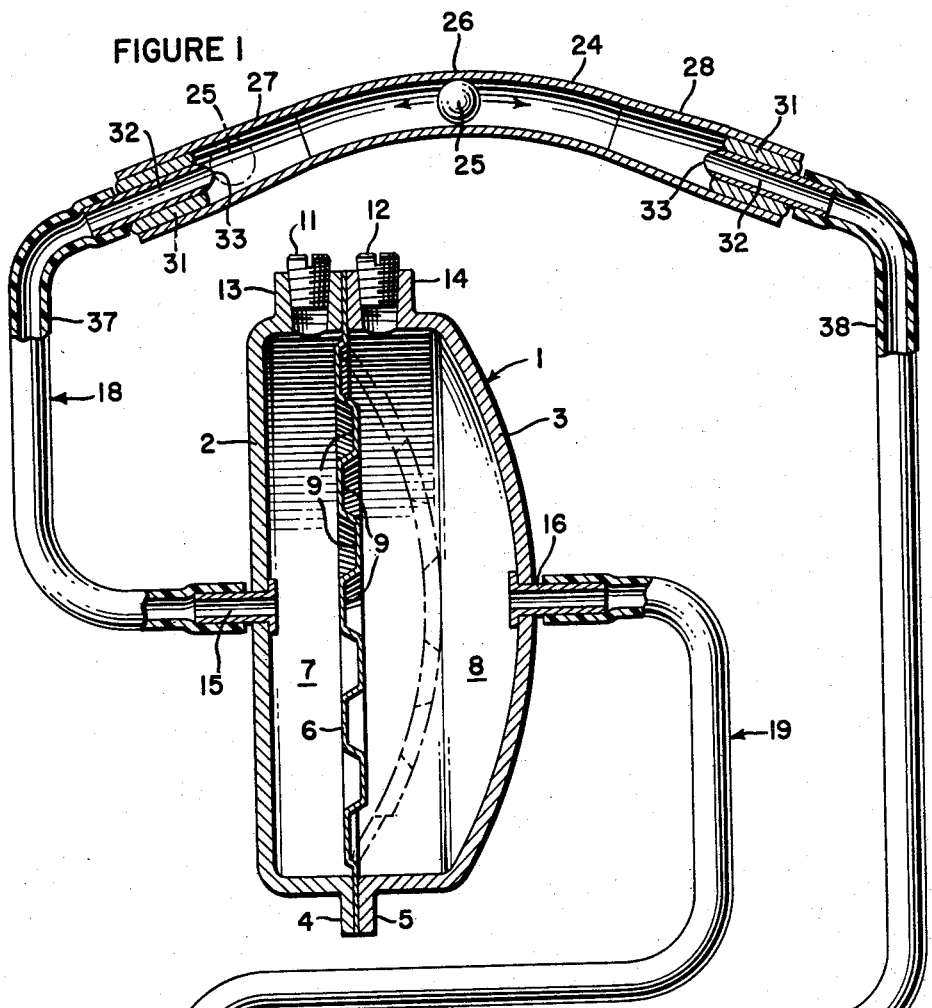
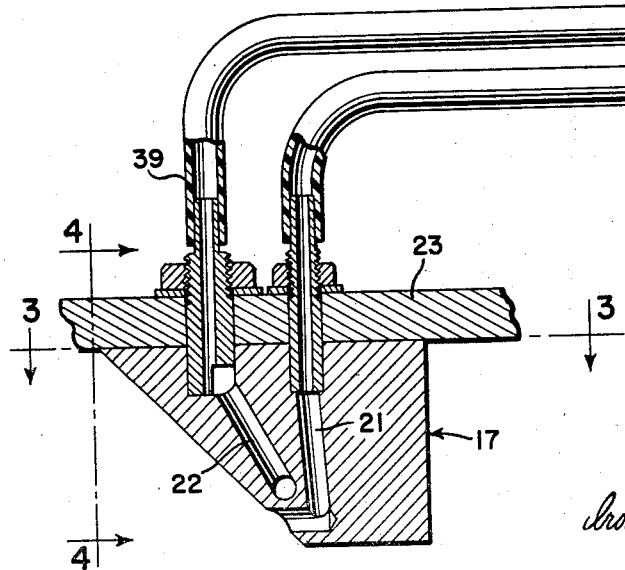
INVENTOR
Joseph Whitehill
ATTORNEYS March 31, 1964 J. WHITEHILL 3,126,739
PRESSURE RESPONSIVE INDICATING APPARATUS
Filed June 13, 1960 5 Sheets-Sheet 2
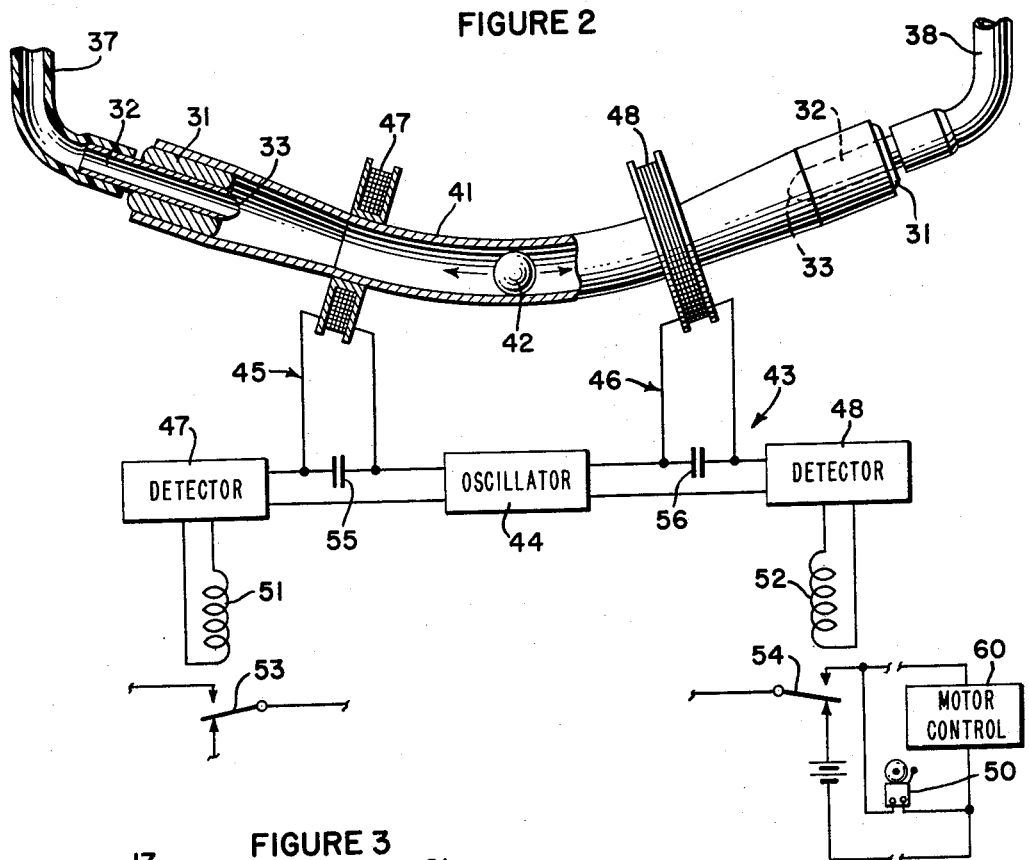
FIGURE 2
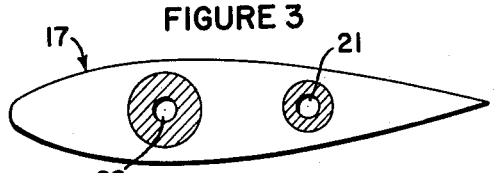
FIGURE 3
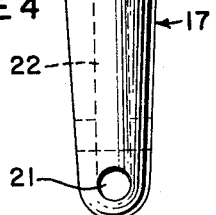
FIGURE 4
FIGURE 5
INVENTOR
Joseph Whitehill
*Irons, Birch, Swindler & McKie*
ATTORNEYS March 31, 1964     J. WHITEHILL     3,126,739
PRESSURE RESPONSIVE INDICATING APPARATUS
Filed June 13, 1960     5 Sheets-Sheet 3

INVENTOR
Joseph Whitehill

BY *Irons, Birch, Swindler & McKie*
ATTORNEYS

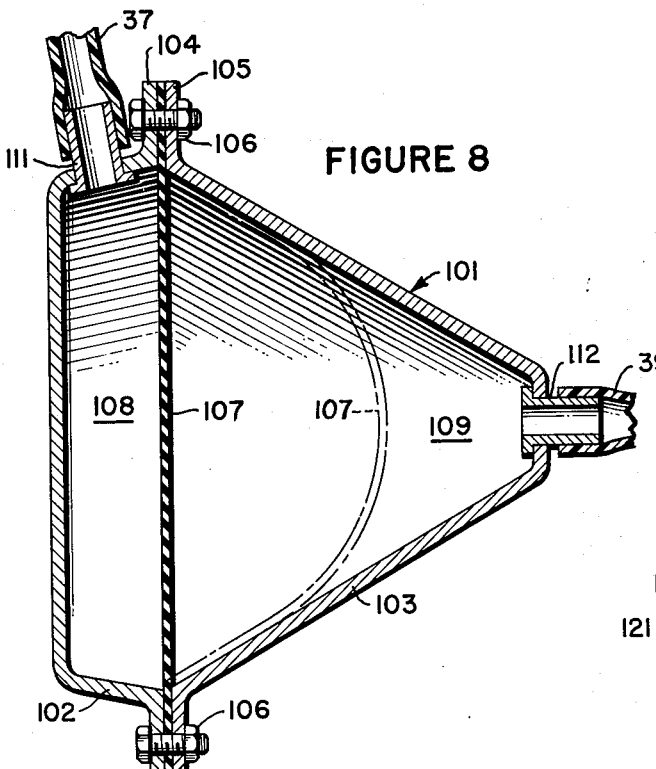
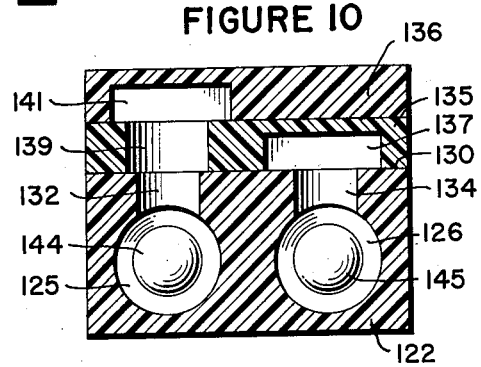
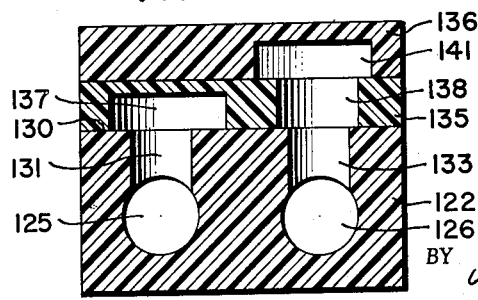

March 31, 1964  J. WHITEHILL  3,126,739
PRESSURE RESPONSIVE INDICATING APPARATUS
Filed June 13, 1960  5 Sheets-Sheet 5

INVENTOR
*Joseph Whitehill*

BY *Irons, Birch, Swindler & McKie*
ATTORNEYS

United States Patent Office 3,126,739
Patented Mar. 31, 1964

3,126,739
PRESSURE RESPONSIVE INDICATING
APPARATUS
Joseph Whitehill, Easton, Md.,
Filed June 13, 1960, Ser. No. 35,751
25 Claims. (Cl. 73—205)

This invention relates to apparatus for indicating pressure changes and more particularly to a pressure responsive apparatus for indicating changes in the relative velocity between said apparatus and a fluid medium.

In many situations where there is relative movement between a device and a fluid medium, it is desirable to obtain an indication of the fact of change in the velocity of such relative movement (i.e., acceleration or deceleration. Frequently the indication of change should be independent of the magnitude of the relative velocity. While some devices capable of indicating the fact of velocity change have been available heretofore, they have generally been attended by certain disadvantages such as high initial and maintenance cost, undue complexity, poor readability, insufficient sensitivity, lack of ruggedness and the like.

To overcome the disadvantages of prior art devices, it is an object of this invention to provide a pressure responsive apparatus for indicating change in the relative velocity between the apparatus and a fluid medium which is very dependable and yet is easy to read, simple, rugged, and inexpensive in both initial and maintenance cost.

A further object of the invention is to provide such an apparatus which is insensitive to the magnitude of the relative velocity between the apparatus and a fluid medium.

A further object of the invention is to provide such an apparatus which is insensitive to changes in the static pressure of such medium.

Still another object of the invention is to provide such an apparatus which is easily alterable as to sensitivity.

It is yet another object of the invention to provide such an apparatus including an electrical indicator of change in relative velocity between the apparatus and a fluid medium.

It is still another object of the invention to provide such an apparatus including means automatically to govern the amount of motivating power causing a vehicle to travel in a fluid medium so as to compensate for changes in the velocity of the vehicle.

It is a further object of the invention to provide an improved fluid pressure balancing device having particular utility with such an apparatus.

It is a still further object of the invention to provide an improved device for indicating direction of fluid flow finding particular utility with such an apparatus.

It is another object of the invention to provide an improved and highly sensitive apparatus for indicating fluid pressure changes.

In general, the apparatus of the invention embraces an indicating device in combination with appropriate fluid control means. The indicating device includes one or more flow responsive elements mounted in one or more conduits through which fluid may flow to actuate the indicator. The control means is responsive to the relative velocity between the apparatus and a fluid medium to cause fluid flow in the conduit in which the indicator element is mounted when the relative velocity changes and to prevent such fluid flow when the relative velocity is constant. Preferably, while the indicator element moves in response to change in the relative velocity, its position in the conduit is independent of the magnitude of such velocity and it returns to its normal position when the relative velocity becomes constant.

The invention finds particular utility in indicating change in the velocity of a vehicle traveling through a fluid medium, for example, a boat traveling through the water or an aircraft or missile traveling through the air. It will be understood, however, that the invention also may be employed at a fixed location to measure change in the velocity of a fluid moving past such location. For example, the apparatus may be connected to a pipe line to indicate changes in velocity of a liquid or gas traveling through the pipe line.

Certain specific embodiments of the invention will now be described in detail with reference to the acompanying drawings in which:

FIGURE 1 is a sectional view of the apparatus of the invention as employed in a boat to indicate change of velocity of the boat as it passes through the water;

FIGURE 2 is a sectional view of an alternative form of indicator according to the invention with a schematic showing of the electrical circuitry thereof;

FIGURE 3 is a horizontal sectional view taken along the line 3—3 of FIGURE 1;

FIGURE 4 is a vertical sectional view taken along the line 4—4 of FIGURE 1;

FIGURE 5 is an isometric view of the end of one of the pipes leading into or out of the indicator tube;

FIGURE 8 is a sectional view of a preferred form of balancing chamber;

FIGURE 9 is a sectional view of another alternative and preferred form of indicator according to the invention;

FIGURE 10 is a sectional view taken along the line 10—10 of FIGURE 9;

FIGURE 11 is a sectional view taken along the line 11—11 of FIGURE 9;

Figure 6:
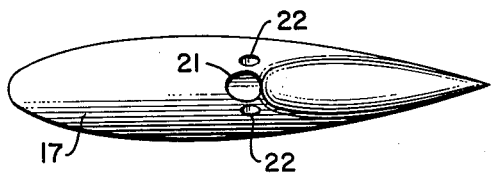
FIGURE 6 is a bottom plan view of the detector assembly.

With reference to the embodiment of the invention shown in FIGURE 1, there is provided as a part of the apparatus a fluid pressure balancing chamber 1 having a pair of housing parts 2 and 3. The latter are generally cup-shaped and are provided with annular flanges 4 and 5 at their open ends. The flanges 4 and 5 are joined by any suitable fluid tight connecting means, not shown, such as by bolting or cementing, with the periphery of a diaphragm 6 sandwiched therebetween. The diaphragm 6 provides a fluid pressure responsive wall which is mounted for resilient yielding and separates the balancing chamber 1 into a pair of smaller chambers 7 and 8. The diaphragm 6 may be made of metal, rubber, synthetic material, or any appropriately elastic substance. Formed in each face of the diaphragm are a plurality of concentric annular depressions 9 which tend to flatten when the diaphragm 6 is exposed to unbalanced fluid pressure on its opposing faces. Thus the diaphragm yields resiliently and is displaced to a limited extent under the force of such unbalanced pressure. When the unbalance in the fluid pressure is constant, the diaphragm will deflect a fixed amount, its resilience compensating for the fluid pressure unbalance. When the unbalance increases to a given extent, the diaphragm will yield to a new stationary position. Correspondingly when there is a decrease in the pressure on the concave side of the displaced diaphragm, its resilience will cause it to assume a fixed position of less displacement. The resilient resistance to deflection of the diaphragm should be sufficient to prevent its striking the outer wall of the chamber 1 over the normal range of operation.

It will be understood that the particular diaphragm and mounting disclosed in the drawing are exemplary only. Various equivalent structures may be employed. For example, a smooth diaphragm without the depressions 9 may be employed especially where the diaphragm comprises a highly resilient substance such as rubber. If desired, springs may be used to resist yielding of the diaphragm. Moreover a convolute bellows assembly of elastic material or a piston opposed by springs on each side or otherwise mounted for resilient yielding might be substituted for the diaphragm.

The chamber parts 2 and 3 are provided with closure plugs 11 and 12 which are threadably received in corresponding internally threaded bosses 13 and 14. Openings to the pressure tight chambers 7 and 8 are provided by flanged tubes 15 and 16 which are fixed to the chamber parts 2 and 3, respectively, by welding, cementing or otherwise to prevent leakage around the tubes.

The tubes 15 and 16 are connected by a pair of conduits 18 and 19 to a Pitot tube detector assembly 17 which is mounted on the bottom 23 of a boat below the water line. The detector assembly includes a housing 20 which contains a Pitot tube 21 and a static tube 22. The housing 17 is very slim and streamlined to decrease its resistance to flow therepast. Moreover the front of the housing is steeply inclined rearwardly to minimize collection on the housing of weeds or other foreign material which might block the openings of the tubes 21 and 22. The conduit 18 is connected to the Pitot or dynamic tube 21 which has an opening exposed to the water and facing toward the front of the boat to sense dynamic fluid pressure in the usual manner when the boat is moving. The conduit 19 is connected to the static tube 22 which has a pair of openings also exposed to the water but directed laterally of the boat so as to be constantly responsive only to static pressures even when the boat is moving. Thus the Pitot and static openings are connected by a long conduit formed by the fluid conducting components described, across which conduit the diaphragm 6 extends to prevent fluid flow completely through such conduit but to permit limited flow in all portions of the conduit due to the yielding of the diaphragm.

The Pitot and static tube openings are fixed against vertical movement relative to one another so that the operation of the device is independent of changes in the static pressure resulting, for example, by increase or decrease in the depth of the water above the openings. Preferably, the Pitot and static openings are approximately at the same level so as to sense substantially the same static pressure. Since the theory of operation of a Pitot tube assembly is well known, it will not be discussed in further detail.

The conduit 18 includes an indicator tube 24 of glass or other transparent material, such as a transparent plastic, which contains a shuttle ball 25, which serves as a movable indicator element. The shuttle ball 25 in the embodiment shown in FIGURE 1 has a lower density than water and may be either solid or hollow. The indicator tube 24 serves as a fluid conduit and is generally U-shaped with the crown 26 of the U disposed at a higher elevation than the legs 27 and 28 of the U. Thus the crown 26 forms a bend at the upper vertical extremity of the tube 24. Thus, when the indicator tube 24 is filled with water and the water is at rest, the shuttle ball 24 will float upwardly and settle at the crown of the U-shaped tube as shown in solid lines at FIGURE 1. When there is a movement of the water in the tube 24, the shuttle ball 25 is displaced by such movement in the direction that the water is traveling as shown in dotted lines in FIGURE 1. Upon cessation of the water movement, the shuttle ball 25 once again will float to the crown 26 of the U-shaped indicator tube.

As shown in FIGURE 1, the inside diameter of the indicator tube increases from the crown portion outwardly toward the ends of the leg portions so that the device is very sensitive when the shuttle ball is at the center or zero position and yet will permit a large flow of water past the ball when it is near the end of one of the legs of the tube. This outward flare may begin at positions spaced from the center of the crown portion 26. Alternatively, the inside diameter of the tube 24 may increase progressively all the way from the center of the crown portion 26 to the ends of the legs 27 and 28.

The ends of the indicator tube 24 are sealed by a pair of water tight plugs 31. Mounted in each of the plugs 31 by a fluid-tight connection is a hollow pipe 32. The openings at the inner ends 33 of the pipes 32 are smaller in diameter than the shuttle ball 25. Thus the pipe ends serve as stops to limit the travel of the shuttle ball. Further, the pipe ends 33 are convex so that their openings have a configuration which does not correspond with the configuration of the shuttle ball 25 to permit the passage of fluid into and out of the pipe ends even when the shuttle ball is resting thereagainst.

The outer end of one of the pipes 32 is connected to the outer end of the tube 15 on the chamber part 2 by means of a flexible tubing 37. The outer end of the other pipe 32 is connected to the upper end of the Pitot tube 21 by means of flexible tubing 38. The outer end of the tube 16 in the chamber part 3 is connected to the static tube 22 by means of flexible tubing 39. The flexible tubing should be substantially non-elastic to prevent its dilation under pressure. All of the various connections in the system are fluid tight. If desired, the entire system including conduits 18 and 19 and the balance chamber 1 may be transparent or translucent to facilitate detection and removal of entrained air bubbles.

The apparatus is mounted on a boat with the detector assembly 17 in the water and the indicator tube 24 visible to the crew of the boat. Preferably the long axis of the tube 24 is aligned with the direction of movement with the rear of the tube 24 connected to the Pitot tube 21. Thus forward acceleration is indicated by forward movement of the shuttle ball 25 as more fully described hereinafter.

In operation, the pressure of the water causes an inflow into the static tube 22 and Pitot tube 21 to fill the conduits 18 and 19 and the chambers 7 and 8 if air is released from the system by removing the plugs 11 and 12 until the chambers are full and then replacing them. As long as the boat is at rest in the water, the static pressure and the Pitot or dynamic pressure are equal so that the pressure in the chambers 7 and 8 on opposite sides of the diaphragm 6 are equal. Thus, there is no deflection of the diaphragm. When the boat moves forward at a constant velocity, the Pitot tube 21 senses the dynamic pressure of the water while the static tube 22 continues to sense the static pressure. There is thus induced in the chamber 7 the dynamic pressure which is equal to the static pressure of the water increased by an amount proportional to the square of the relative velocity between the boat and the water. Since the pressure in the chamber 8 remains equal to the static pressure of the water, the diaphragm 6 will be deflected to the right as shown in FIGURE 1 to a given position. As long as the relative velocity remains constant, the diaphragm 6, while deflected, will remain stationary so that there is no movement of the water in the tubes 18 and 19. When there is an increase in velocity, however, the pressure in the chamber 7 will be increased to cause the diaphragm 6 to move to the right (as shown in FIGURE 1) and to effect a temporary flow of water through the conduits 18 and 19. The flow through the tube 24 displaces the shuttle ball 25 to the left as shown in FIGURE 1. The movement of the diaphragm 6 and the temporary flow through the tube 24 continues as long as the velocity continues to change. When the velocity again becomes constant at the increased amount, the pressure differential on opposite sides of the diaphragm 6 will become constant and the resilient resistance of the diaphragm to displacement will bring it to a stop thereby preventing further flow of fluid in the conduit system. Upon cessation of the temporary flow in the tube 24, the shuttle ball 25 will float to the center of the crown 26 of the U-shaped indicator tube. It follows that when there is a decrease in velocity of the boat through the water, the diaphragm 6 will move in the opposite direction and there will be a temporary flow in the tube 24 in the opposite direction. The shuttle ball 25 will then be displaced to the right of the crown 26 (as shown in FIGURE 1) and upon cessation of the temporary flow due to stabilization of the velocity at a lower constant rate, the shuttle ball 25 will again return to the crown or zero position of the indicator tube.

The sensitivity of the indicator may be varied by changing the diameter of the ball 25 with respect to the inside diameter of the tube 24. When the ball is nearly large enough to fill the tube, it will be noticeably deflected by a very slow rate of change in velocity of the boat and will return to the zero position very slowly when the velocity again stabilizes. As an example of the great sensitivity that can be achieved, it has been found that an increase in speed of .01 knot can be detected when the boat is traveling at about 1.5 knots. When the ball 25 is considerably smaller than the inside diameter of the tube 24, there will be little deflection at a slow rate of change of velocity and the ball will return to the zero position much more quickly. In a boat which has limited acceleration, it is preferable to employ a shuttle ball which is large relative to the indicator tube. Correspondingly, in a boat which is capable of very rapid acceleration, a ball considerably smaller than the indicator tube would be desirable. Thus several balls of varying diameters may be provided for individual use depending upon the desired sensitivity.

Disclosed in FIGURE 2 is a modified form of indicator tube 41. The tube 41 is mounted in the system in the same manner as the tube 24 and is identical thereto except that the tube 41 is inverted with respect to the tube 24, i.e., the tube 41 is generally U-shaped with its middle portion disposed below its leg portions to form a bend at its lower vertical extremity. The tube 41 contains a shuttle ball 42 which is more dense than water. The ball 42 normally rests at the central or zero position of the generally U-shaped tube 41 and is displaced therefrom by temporary movement of fluid in the tube 41 in the same manner as previously described. When there is a cessation of flow of fluid through the tube 41, the shuttle ball 42 returns by gravity to the central or zero position in the tube 41. The tube 41 may be transparent so that the movement of the ball 42 may be observed. In the embodiment shown in FIGURE 2, however, it is not essential that the tube 41 be transparent because electrical means are provided to indicate displacement of the shuttle ball 42 corresponding to a change in velocity of the boat through the water.

The ball 42 is made of ferromagnetic material. An electrical system 43 is provided to detect displacement of the ball 42. This system includes an oscillator 44 which generates continuous alternating current at a particular frequency. The current generated by the oscillator is divided and fed equally to two identical LC bandstop filters 45 and 46. The resonant inductance of each of these filters is provided by a coil of wire surrounding one leg of the U-shaped indicator tube 41. These coils are shown at 47 and 48. The filters also include capacitors 55 and 56 connected across the coils 47 and 48 respectively. The filters 45 and 46 are connected to detectors 47 and 48 which in turn are connected to relays 51 and 52 which operate switches 53 and 54.

When the ferromagnetic shuttle ball 42 is at rest in the zero position in the indicator tube, the resonant frequency of the tank circuit in each of the LC filters is the same as the fundamental frequency of the oscillator. Thus, the energy of the oscillator is blocked by the high impedance of the filter and no current or substantially none reaches the detectors 47 and 48. It will be understood that filter circuits may be employed which shunt the current out of the oscillator to ground instead of stopping it by high filter impedance.

When the ball is driven toward one or the other of the coils 47 or 48, its passage through such coil changes that coil's inductance radically which in turn changes the resonant frequency of that particular LC filter. Energy then may pass the filter and enter the detector. The function of the detectors is to rectify the alternating current that passes the filters into pulsating direct current for operating of the relays. The associated relay is actuated to operate its switch which is included in a related circuit (only one of which is shown) so as to actuate a signal such as a bell 50, and a conventional speed control device 60 connected to the boat motor. The control device 60 could comprise, for example, a pair of stepping solenoids connected to the motor throttle. When the boat accelerates, one of the control devices 60 is operated to decrease the speed of the motor and correspondingly when the boat decelerates the other control device is operated to increase the speed.

If desired, either the signal 50 or the control device 60 may be eliminated from the switch circuits and the other retained.

It will be understood that the specific electrical circuitry shown in FIGURE 2 is exemplary only. Many different circuits could be employed to accomplish the same result.

The indicator tube 24 or 41 may be mounted in the conduit 18 as shown or, alternatively, may be mounted in the conduit 19, since congruent and reciprocal temporary flowing of water will occur in both conduits at the same time. Moreover, two indicator tubes may be used simultaneously, one in each of the conduits 18 and 19. Still further, a multiplicity of indicator tubes could be employed in series in either or both of the conduits 18 and 19 if multiple observation points are desired.

The particular forms of indicator assemblies shown in FIGURES 1 and 2 are illustrative only and alternative types of indicators may be employed within the broad framework of the invention. For example, the shuttle ball might be a gas inflated soft plastic bubble that actually touches the bore of the indicator tube all around.

Further, the indicator tube can be perfectly straight and positive means other than a bent tube may be used to return the shuttle element to its zero position. For example, the shuttle ball 25 or 42 could be returned to the center position by a pair of opposing compression springs rather than by floating or gravity. Moreover, the shuttle ball could be replaced by a flat vane or gate extending across the tube bore and pivotally connected at its upper end to the zero position for deflection by fluid flow in either direction and return by gravity to a vertical position upon cessation of flow. Alternatively, a flexible indicator such as a fuzz ball or a piece of fabric could be attached at its upper end to the zero position in the tube to be swung into a horizontal or near horizontal position by the temporary flow and to return to a vertical or otherwise collapsed position upon cessation of the flow. The ferromagnetic shuttle ball 42 could be returned to its zero position by magnetic means such as a U-magnet disposed with its poles on opposite sides of the indicator tube at the zero position.

Moreover, indicators other than a viewable shuttle element may be employed. For example, a movable element might be employed in the indicator tube to actuate a mechanical indicator located outside of the indicator tube.

Figure 7:
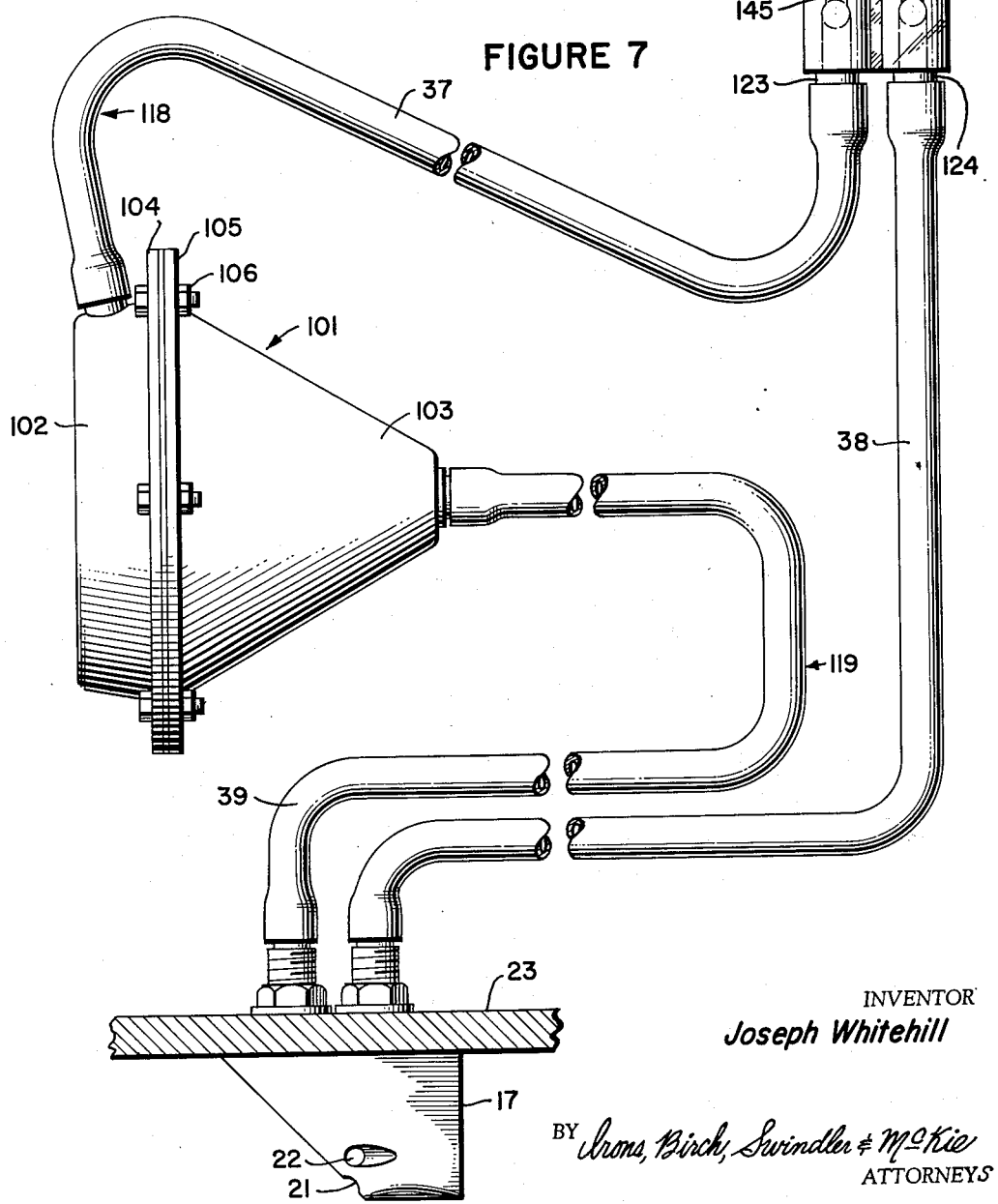
FIGURE 7 is a view partly in section of a modified and preferred embodiment of the apparatus of the invention.
Figure 12:
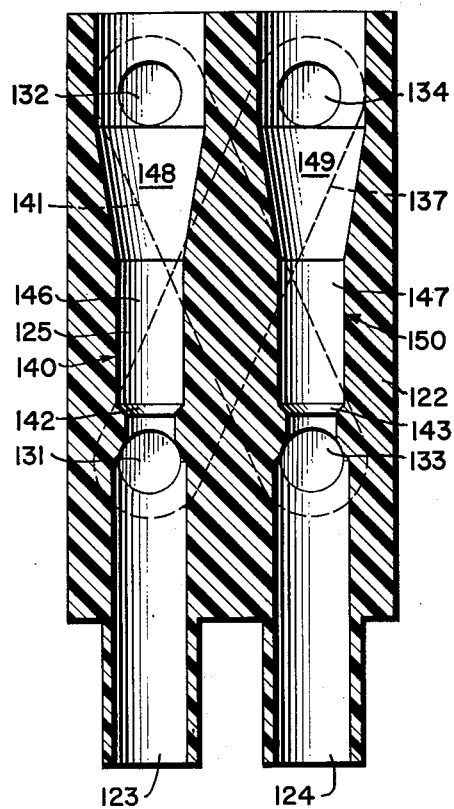
FIGURE 12 is a sectional view taken along the line 12—12 of FIGURE 9.
Figure 13:
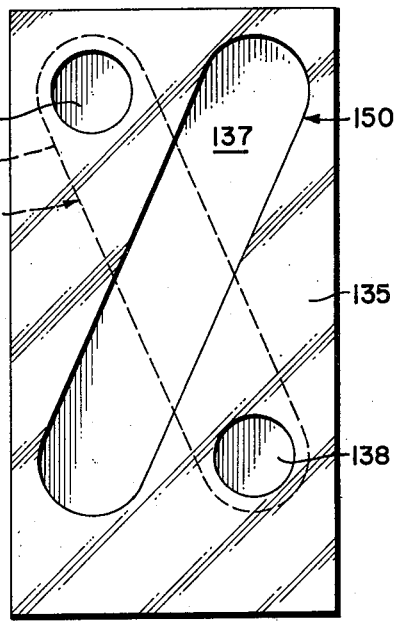
FIGURE 13 is a view of the inside face of the cover plates for the indicator of FIGURE 9.

Shown in FIGURES 7 through 13 is a preferred form of the apparatus of the invnetion which is identical to the device of FIGURE 1 except that the former embodies alternative and preferred forms of indicator and balancing chamber. The general manner of operation of the devices of FIGURES 1 and 7 is the same.

The balancing chamber 101 is shown in FIGURE 7 and in section in FIGURE 8. It includes a housing having two parts 102 and 103 which are generally cup-shaped and are provided with annular flanges 104 and 105 at their open ends. Such flanges are joined by a fluid tight connection which includes the bolts 106 or any other suitable fastening means with the periphery of a diaphragm 107 sandwiched between the flanges. The diaphragm 107 provides a fluid pressure responsive wall which is mounted for resilient yielding and separates the balancing chamber 101 into a pair of smaller chambers 108 and 109. The diaphragm 107 is formed of rubber or any other suitable material having the general resilient characteristics of rubber. The diaphragm 107 is highly resilient and when there is even a slight increase in the pressure in the chamber 108 relative to the pressure in the chamber 109 the diaphragm 107 will deflect toward the chamber 109 as shown in dotted lines in FIGURE 8.

The wall of the housing part 103 tapers inwardly away from the diaphragm 107 so that its cross-sectional area progressively decreases away from the diaphragm. To achieve such a taper the housing part 103 preferably is frusto-conical in configuration. Thus when the diaphragm flexes due to relatively high pressure in the chamber 108 the peripheral portion of the diaphragm is flattened against the frusto-conical wall of the chamber 109 leaving as the effective area of the diaphragm only that portion in the center of the diaphragm which is free of the chamber walls and extends thereacross. Consequently when the pressure in the chamber 108 relative to the chamber 109 progressively increases, the diaphragm flexes into increasing engagement with the frusto-conical inner wall of the chamber 109 to decrease progressively the effective area of the diaphragm extending across the housing.

The tapered configuration of the chamber 109 is characterized by an important advantage. When the diaphragm 107 is subjected to unbalanced pressure it tends to assume the form of a sphere. If the resistance to the unbalanced pressure is assumed solely by the highly resilient diaphragm, it would quickly balloon to a very large size and completely fill the housing. If in compensation, the diaphragm were made extremely resistant to deflection, its sensitivity would be correspondingly diminished. With the present invention, the peripheral portions of the diaphragm lie flat against the frusto-conical housing wall and the unbalanced pressure is resisted in large measure by the housing wall. Only the free central portion of the diaphragm is subjected to flexure. Accordingly, an extremely resilient and sensitive diaphragm may be subjected to a much higher pressure unbalance without an undue increase in the size of the chamber 109.

The housing parts 102 and 103 are provided with flanged tubes 111 and 112 which extend through and are affixed by fluid tight connections to the housing parts 102 and 103 respectively, to provide fluid connections between the conduit 37 and the chamber 108 and the conduit 39 and the chamber 109.

The operation of the balancing chamber 101 is the same as that of the balancing chamber 1. When the unbalance in the fluid pressure on opposite sides of the diaphragm is constant the diaphragm will deflect a fixed amount, its resilience compensating for the fluid pressure unbalance. When the unbalance increases to a given extent, the diaphragm will yield to a new stationary position. Correspondingly when there is a decrease in the pressure on the concave side of the displaced diaphragm, its resilience will cause it to assume a fixed position of less displacement. The resilient resistance to deflection of the diaphragm and the taper of the housing part 103 should be selected to preclude the diaphragm's striking the extreme end of the housing part 103 over the normal range of operation.

The balancing chamber 101 is connected by the conduits 118 and 119 to the Pitot tube detector assembly 17. The conduit 118 includes passageways through a flow directional indicator assembly 121. If desired the indicator assembly may be connected to the conduit 119 instead of the conduit 118. The indicator assembly includes a body portion 122 provided with a pair of external connections 123 and 124 to provide fluid communication between the indicator and the conduits 37 and 38 respectively. Also in fluid communication with the connections 123 and 124 are a pair of passages 125 and 126 respectively, extending in side by side relationship longitudinally from top to bottom of the body portion 122. The tops of the passages 125 and 126 are each closed by a cap 127 which is sealed relative to the passageway and is bored to receive a tapered plug 128. The plug 128 is received in frictional gripping relationship within the cap 127 and may easily be removed to permit bleeding of the indicator assembly. The body portion 122 is also provided with lateral passages 131 and 132 extending from the bottom and top respectively of the longitudinal passageway 125 and passing through the side wall 130 of the body portion. Similarly a pair of lateral passages 133 and 134 extend from the bottom and top respectively of the longitudinal passageway 126 through the side wall 130 of the body portion 122.

Affixed in sealed relationship as by adhesive bonding to the side wall 130, is an inner cover plate 135 which overlies the passages 131, 132, 133 and 134. An outer cover plate 136 is adhesively bonded or otherwise affixed in sealed relationship to the inner cover plate 135. The inner cover plate 135 is provided with a slot 137 which provides a cross passage connecting in fluid communication the lateral passageway 131 at the bottom of the longitudinal passageway 125 with the lateral passageway 134 at the top of the longitudinal passageway 126. The inner cover plate 135 is also provided with a pair of lateral passages 138 and 139 which extend completely through the cover plate 135 and form extensions of the lateral passageway 133 at the bottom of longitudinal passageway 126 and the lateral passageway 132 at the top of the longitudinal passageway 125. The outer cover plate 136 is provided with a slot 141 which forms a cross passage connecting the lateral passages 138 and 139 in the inner cover plate 135.

The system of passageways within the indicator 121 forms a fluid conduit arranged in a closed loop. The connections 123 and 124 communicate with such conduit at different locations on the loop. Beginning at the inner end of the connection 123 the closed loop comprises in turn the passageways 125, 132, 139, 141, 138, 133, 126, 134, 137, and 131. Different branches 140 and 150 of the loop provide alternate flow paths between the connections 123 and 124. The branch 140 moving from the connection 123 to the connection 124 includes the passageways 125, 132, 139, 141, 138, and 133. The other branch 150 moving from the connection 124 to the connection 123 includes the passageways 126, 134, 137, and 131.

Positioned within the passageways 125 and 126 between the lateral passages at the top and bottom thereof are valve seats 142 and 143 respectively (FIGURE 12), facing away from the connections 123 and 124. Co-operable with the valve seats 142 and 143 are check valve indicator elements 144 and 145, respectively. Each of the valves is unseated and moved upwardly when upward fluid flow occurs in its passageway. Similarly each of the valves moves downwardly when fluid tends to flow downwardly in its passageway and is seated to prevent such downward flow. To insure substantial movement of the valves the lower portions 146 and 147 of the passageways 125 and 126 are straight or cylindrical with diameters only slightly greater than the diameter of the valves so that only a slight clearance for the valve is provided. The upper portions 148 and 149 of the passageways 125 and 126 are tapered upwardly to provide a greater clearance for the valves. Consequently, when upward flow occurs through one of the passages 125 or 126 the valve element therein is moved upwardly through the passageway portion 146 or 147. During this initial movement of the valve, very little fluid escapes around its edges. The valve is therefore moved rapidly upwardly through the straight passageway portion into the tapered passageway portion to permit a greater amount of fluid to escape around the edges of the valve. Upward movement of the valve elements is limited by the tapered plugs 128, the bottom ends of which serve as stops to prevent the valve elements from seating in the ends of passageways 132 and 134.

The body portion 122 and the cover plates 135 and 136 of the indicator preferably are molded of a transparent synthetic resinous material. The valve elements preferably are of a color which sharply contrasts with the transparent material. Thus the movement of the valves may be clearly observed by an operator. If desired the entire indicator body need not be transparent but instead there may be only a sufficient transparent portion thereof in the vicinity of the valve elements to permit visual observation of the movement of the valve elements.

As a further alternative, additional indicator means responsive to the movement of the valve elements may be employed outside of the pasasgeways 125 and 126. In this event the indicator body portion need not be transparent. For example, the valve elements may be of magnetic material and appropriate electrical means may be employed to indicate movement of the valve elements.

In the operation of the indicator assembly 121, fluid flow into the connection 123 and out of the connection 124 occurs through the branch 140 thereby lifting the valve 144. The fluid cannot flow through the branch 150 because it tends to move downwardly through the passageway 126 and therefore seats the valve 145. Conversely fluid flow into the connection 124 and out of the connection 123 occurs solely through branch 150 lifting the valve element 145 and seating valve element 144 to prevent flow through the branch 140. Preferably no flow is permitted past the valve which is seated, but the invention is operable if some leakage around the seated valve is permitted. In this event the greater portion of the flow in either direction would occur through one branch of the loop with a small portion of the flow occurring through the other branch. The valve elements would still effectively open and close to function as indicators.

With the components assembled as shown in FIGURE 7, an increase in the speed of the boat through the water would cause a temporary flow from the connection 124 to the connection 123 thereby raising valve element 145 and seating valve element 144. Upon a decrease in the boat speed, flow occurs in the opposite direction from the connection 123 to the connection 124 to raise valve element 144 and seat valve element 145. In either case, when the speed again becomes constant, the raised valve element drops by gravity to its original position.

The conduits 38 and 39 may be connected to various pressure sources other than a Pitot assembly and the apparatus functions as a highly sensitive pressure-change indicator.

While the invention has been described with respect to specific embodiments, it will be understood that other modifications may be made by persons skilled in the art without departing from the scope of the invention as embraced by the appended claims.

This application is a continuation-in-part of my co-pending application Serial Number 861,144, filed December 21, 1959, entitled Apparatus for Indicating Change in Velocity, now abandoned.

I claim:
1. An apparatus for indicating change in the relative velocity between said apparatus and a fluid medium which comprises conduit means, resiliently yieldable wall means extending across said conduit means to provide a fluid seal, said conduit means being connectable on one side of said wall means to a source of fluid under a first pressure, means responsive to said relative velocity and connected to said conduit means on the other side of said wall means to expose said other side to a second fluid pressure varying from said first pressure in proportion to said relative velocity thereby causing said wall means to resiliently yield and fluid to flow in said conduit when said relative velocity changes and said wall means to come to rest and the fluid flow in said conduit to cease when said relative velocity becomes constant, indicator means including a moveable element positioned in said conduit means, and responsive to fluid flow to indicate a change in said relative velocity, and means to maintain said element at a predetermined location along said conduit means in the absence of fluid flow to indicate constant relative velocity regardless of the position of said wall means.

2. An apparatus as recited in claim 1 wherein said relative velocity responsive means comprises Pitot detector means having a dynamic opening facing into said fluid medium to provide said second fluid pressure, said detector means having a static opening into said fluid medium and connected to the conduit means on said one side of said wall means to provide said first fluid pressure.

3. An apparatus as recited in claim 1 wherein the cross sectional area of said conduit means is substantially less at the location of said element than at the location of said wall means.

4. An apparatus as recited in claim 3 wherein said wall means comprises a diaphragm and the cross sectional area of said conduit means progressively decreases away from said one side of said diaphragm so that yielding of said diaphragm toward said one side causes said diaphragm to increasingly engage said conduit means to progressively decrease the effective area of the diaphragm extending across said conduit means.

5. An apparatus as recited in claim 1 wherein said element is moveable longitudinally in said conduit away from said single location in response to fluid flow in the conduit.

6. An apparatus as recited in claim 5 wherein the density of said element relative to the density of the fluid in which it moves and the configuration of said conduit means at said predetermined location are such as to cause said element to move to said predetermined location when the fluid is at rest in said conduit means.

7. An apparatus as recited in claim 6 wherein said conduit means has a transparent portion adjacent said predetermined location and said element is visible through said transparent portion to provide said indications.

8. An apparatus as recited in claim 5 wherein said means to maintain said element at a single predetermined location comprises a portion of said conduit means having a bend at a vertical extremity at said single location, the density of said element relative to the density of the fluid in which it moves being such as to cause said element to move to said vertical extremity when the fluid is at rest in said conduit means.

9. An apparatus as recited in claim 1 wherein said element contains ferromagnetic material and said indicator means includes electrical means responsive to the movement of said element.

10. An apparatus as recited in claim 9 for mounting on a vehicle driven by power means through a fluid medium wherein said electrical means comprises means to control said power means to govern the speed of the vehicle.

11. An apparatus as recited in claim 7 wherein the inside cross sectional area of said conduit means increases progressively outwardly from said vertical extremity.

12. An apparatus as recited in claim 8 wherein stop means is provided in said conduit means spaced from said vertical extremity to limit the movement of said element.

13. An apparatus as recited in claim 2 wherein said detector means is encased in a thin elongated housing extending in the direction of fluid flow and having a rearwardly inclined edge facing into the flowing fluid.

14. An apparatus as recited in claim 12 wherein said stop means defines a pair of reduced openings in said conduit means on opposite sides of said vertical extremity, the configuration of said openings being different from the configuration of said shuttle element to permit passage of fluid through said openings when said shuttle element is positioned thereagainst.

15. An apparatus for indicating direction of fluid flow which comprises fluid conduit means forming a closed loop, said conduit means having a pair of fluid connections at different locations on said loop with different branches of said loop providing separate flow paths between said connections, indicator means responsive to direction of fluid flow through said conduit means between said connections and including valve means mounted in said loop to direct at least the greater portion of said fluid flow in one direction through one of said branches and in the opposite direction through the other of said branches.

16. An apparatus for indicating direction of fluid flow which comprises fluid conduit means forming a closed loop, said conduit means having a pair of fluid connections at different locations on said loop with different branches of said loop providing separate flow paths between said connections, indicator means responsive to direction of fluid flow through said conduit means between said connections and including a pair of check valve means mounted in different ones of said branches and oriented to direct at least the greater portion of said fluid flow in one direction through one of said branches and in the opposite direction through the other of said branches, the operation of said check valves providing an indication of the direction of said fluid flow.

17. An apparatus for indicating direction of fluid flow which comprises fluid conduit means forming a closed loop, said conduit means having a pair of fluid connections at different locations on said loop with different branches of said loop providing separate flow paths between said connections, indicator means responsive to direction of fluid flow through said conduit means between said connections and including a pair of check valve means mounted in different ones of said branches and oriented to direct at least the greater portion of said fluid flow in one direction through one of said branches and in the opposite direction through the other of said branches, said conduit means being transparent to expose the operation of said check valve means to provide an indication of the direction of said fluid flow.

18. An apparatus for indicating direction of fluid flow which comprises fluid conduit means forming a closed loop, said conduit means having a pair of fluid connections at different locations on said loop with different branches of said loop providing separate flow paths between said connections, indicator means responsive to direction of fluid flow through said conduit means between said connections and including valve seats and check valves co-operable therewith mounted in each of said branches and oriented to direct at least the greater portion of said fluid flow in one directon through one of said branches and in the opposite direction through the other of said branches, said conduit means being transparent to expose the operation of said check valves, said conduit means providing a relatively small clearance for each of said check valves over an initial portion of a path of movement thereof away from its valve seat and a relatively large clearance for a subsequent portion of said path of movement to effect substantial movement of said check valves and provide a visual indication of the direction of said fluid flow.

19. An apparatus as recited in claim 18 wherein the portions of said conduit means in which said check valves move are mounted in side-by-side relationship.

20. An apparatus as recited in claim 19 wherein said loop includes cross passages interconnecting opposite ends of said portions of said conduit means so that opening movement of each of said check valves will be in the same direction.

21. An apparatus for indicating change in the relative velocity between said apparatus and a fluid medium which comprises fluid conduit means forming a closed loop, said conduit means having a pair of fluid connections at different locations on said loop with different branches of said loop providing separate flow paths between said connections, indicator means responsive to direction of fluid flow through said conduit means between said connections and including valve means mounted in said loop to direct at least the greater portion of said fluid flow in one direction through one of said branches and in the opposite direction through the other of said branches, and fluid control means responsive to said relative velocity and connected to said fluid connections to cause fluid flow in said branches between said connections in opposite directions to activate said indicator means when said relative velocity increases and decreases respectively and to prevent fluid flow in said branches when said relative velocity is constant.

22. An apparatus for indicating change in the relative velocity between said apparatus and a fluid medium which comprises fluid conduit means forming a closed loop, said conduit means having a pair of fluid connections at different locations on said loop with dfferent branches of said loop providing separate flow paths between said connections, indicator means responsive to direction of fluid flow through said conduit means between said connections and including valve means mounted in said loop to direct at least the greater portion of said fluid flow in one direction through one of said branches and in the opposite direction through the other of said branches, detector means responsive to said relative velocity and adapted to be positioned in said fluid medium, said detector means being connected to said fluid connections to cause fluid flow in said branches between said connections in opposite directions to activate said indicator means when said relative velocity increases and decreases respectively, and fluid pressure responsive balancing means connected between one of said connections and said detector means to stop the fluid flow in said conduit when said relative velocity becomes constant.

23. An apparatus for indicating change in the relative velocity between said apparatus and a fluid medium which comprises fluid conduit means forming a closed loop, said conduit means having a pair of fluid connections at different locations on said loop with different branches of said loop providing separate flow paths between said connections, indicator means responsive to direction of fluid flow through said conduit means between said connections and including a pair of check valve means mounted in different ones of said branches to direct at least the greater portion of said fluid flow in one direction through one of said branches and in the opposite direction through the other of said branches, the operation of said check valve means providing an indication of the direction of said fluid flow, detector means responsive to said relative velocity and adapted to be positioned in said fluid medium, said detector means being connected to said fluid connections to cause fluid flow in said branches between said connections in opposite directions to activate said indicator means when said relative velocity increases and decreases respectively, and a fluid pressure balancing device comprising a pressure tight housing, a diaphragm connected across and dividing said housing into a pair of fluid pressure chambers, at least a first of said chambers having a cross-sectional area which progressively decreases away from said diaphragm, said diaphragm being highly resilient so that progressive increase in the pressure of the second chamber relative to said first chamber causes said diaphragm to flex into increasing engagement with the inner wall of said first chamber to decrease progressively the effective area of said diaphragm extending across said housing, said balancing device being connected between one of said fluid connections and said detector means with one of said chambers in fluid communication with said one fluid connection and the other of said chambers being in fluid communication with said detector means to stop the fluid flow in said loop when said relative velocity becomes constant.

24. An apparatus for indicating pressure change which comprises conduit means, resiliently yieldable wall means extending across said conduit means to provide a fluid seal, said conduit means being connectable on opposite sides of said wall means respectively to first and second sources of fluid under first and second pressures variable from each other thereby exposing the opposite side of said wall means to differential pressure so that said wall means yields and fluid flows in said conduit means in response to variation in said differential and said wall means comes to rest and fluid ceases to flow in said conduit means when said differential becomes constant, indicator means including a moveable element positioned in said conduit means between said sources and responsive to fluid flow to indicate a change in said differential, and means to maintain said element at a predetermined location along said conduit means in the absence of fluid flow to indicate constant differential regardless of the position of said wall means.

25. An apparatus as recited in claim 24 wherein the cross sectional area of said conduit means is substantially less at the location of said element than at the location of said wall means.

References Cited in the file of this patent

UNITED STATES PATENTS

| | | |
|---|---|---|
| 1,023,132 | Custer | Apr. 16, 1912 |
| 1,352,391 | Starling et al. | Sept. 7, 1920 |
| 1,451,064 | Dunajeff | Apr. 10, 1923 |
| 2,008,885 | Upson | July 23, 1935 |
| 2,009,427 | Bentzel | July 30, 1935 |
| 2,679,760 | Hartland et al. | June 1, 1954 |
| 2,715,705 | Barstow et al. | Aug. 16, 1955 |
| 2,776,829 | Cockram | Jan. 8, 1957 |
| 2,825,361 | Seljos | Mar. 4, 1958 |

FOREIGN PATENTS

| | | |
|---|---|---|
| 200,530 | Great Britain | Oct. 10, 1924 |
| 545,527 | Italy | July 3, 1956 |